US012714896B2

(12) United States Patent
Lupien et al.

(10) Patent No.: US 12,714,896 B2
(45) Date of Patent: Aug. 25, 2026

(54) IN-SITU PRESSURIZED RESTAURANT SYSTEM

(71) Applicant: KIDDE-FENWAL, LLC, Ashland, MA (US)

(72) Inventors: Richard Lupien, Grafton, MA (US); Kevin Richards, Westford, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 400 days.

(21) Appl. No.: 18/307,298

(22) Filed: Apr. 26, 2023

(65) Prior Publication Data

US 2023/0381562 A1 Nov. 30, 2023

Related U.S. Application Data

(60) Provisional application No. 63/365,276, filed on May 25, 2022.

(51) Int. Cl.

| | |
|---|---|
| ***A62C 35/02*** | (2006.01) |
| ***A62C 3/00*** | (2006.01) |
| ***F17C 13/02*** | (2006.01) |

(52) U.S. Cl.

CPC ............ *A62C 35/023* (2013.01); *A62C 3/006* (2013.01); *F17C 13/025* (2013.01); *F17C 2250/043* (2013.01); *F17C 2270/0754* (2013.01)

(58) Field of Classification Search

CPC ....... A62C 3/006; A62C 35/023; A62C 35/13; A62C 37/44; A62C 37/50; A62C 13/003; A62C 13/64; A62C 2/04; F17C 2270/0754; F17C 13/025; F71C 2250/43; F24C 15/2021; F24C 7/08

See application file for complete search history.

(56) References Cited

U.S. PATENT DOCUMENTS

| | | | | |
|---|---|---|---|---|
| 2002/0027143 A1* | 3/2002 | Schoenrock | ........... | A62C 31/02 222/200 |
| 2014/0202719 A1* | 7/2014 | Senecal | ................ | A62C 35/023 169/46 |
| 2018/0169450 A1* | 6/2018 | Moffa | .................. | A62C 35/023 |
| 2021/0220683 A1* | 7/2021 | Lines | ................... | A62C 35/023 |

* cited by examiner

*Primary Examiner* — Christopher R Dandridge
(74) *Attorney, Agent, or Firm* — Honigman, LLP; Andrew Boes

(57) ABSTRACT

A fire suppression system is disclosed. The fire suppression system comprises an agent storage cylinder configured for storing a fire suppression agent, the cylinder operatively connected to a charging valve. The system further comprises a cartridge for holding a pressurized gas, wherein the cartridge is configured to operatively connect to the charging valve; release gas into an ullage space of the cylinder to pressurize the cylinder; and disconnect from the cylinder responsive to a pressure inside the cylinder reaching a threshold pressure.

13 Claims, 3 Drawing Sheets

IN-SITU PRESSURIZED AGENT CYL.

IN-SITU PRESSURIZED RESTAURANT SYSTEM

CROSS REFERENCE TO A RELATED APPLICATION

The application claims the benefit of U.S. Provisional Application No. 63/365,276 filed May 25, 2022, the contents of which are hereby incorporated in their entirety.

BACKGROUND

The invention relates generally to fire suppression systems and, more specifically, to in-situ pressurization of fire suppression systems.

Current fire suppression systems are generally provided in two configurations: stored pressure or cartridge operated non-stored pressure. Stored pressure units generally require the transport of pressurized heavy-cylinders deemed a hazardous good by the regulations. Cartridge operated units generally require a separate pressurized unit connected to the agent cylinders via added distribution network, which requires additional field service work.

BRIEF DESCRIPTION

Aspects of the disclosure relate to methods, apparatuses, and/or systems for in-situ pressurization of fire suppression systems.

In some embodiments, a fire suppression system is disclosed. The fire suppression system comprises an agent storage cylinder configured for storing a fire suppression agent. The cylinder is operatively connected to a charging valve. The system further comprises a cartridge for holding a pressurized gas. The cartridge is configured to: operatively connect to the charging valve; release gas into an ullage space of the cylinder to pressurize the cylinder; and disconnect from the charging valve responsive to a pressure inside the cylinder reaching a threshold pressure In some embodiments, the charging valve is integral with the cylinder.

In some embodiments, the cartridge comprises a gas discharge valve, the gas discharge valve configured to interface with the charging valve.

In some embodiments, the fire suppression system comprises a pressure sensor configured for measuring pressure inside the cylinder.

In some embodiments, the fire suppression system comprises a temperature sensor configured for measuring temperature inside the cylinder, and wherein the cartridge is configured to disconnect based on the pressure and temperature inside the cylinder In some embodiments, a method for in-situ pressurization of an agent storage cylinder is provided. The method comprises operatively connecting a pressurized gas holding cartridge to a charging valve of the cylinder; releasing gas, from the cartridge into an ullage space of the cylinder to pressurize the cylinder; and disconnecting the cartridge from the cylinder responsive to a pressure inside the cylinder reaching a threshold pressure.

In some embodiments, the method further comprises controlling the charging valve based on the pressure inside the cylinder.

In some embodiments, the method further comprises reducing and/or stopping a flow of pressurization of the cylinder based on the pressure inside the cylinder.

In some embodiments, an agent storage cylinder is provided. The agent storage cylinder is configured to be pressurized in-situ using a pressurized gas holding cartridge. The cylinder is configured to operatively connect a charging valve of the cylinder to the cartridge; receive gas, from the cartridge, into an ullage space of the cylinder; and disconnect from the cartridge responsive to the pressure inside the cylinder reaching a threshold pressure.

Various other aspects, features, and advantages of the invention will be apparent through the detailed description of the invention and the drawings attached hereto. It is also to be understood that both the foregoing general description and the following detailed description are examples and not restrictive of the scope of the invention.

DETAILED DESCRIPTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Generally, stored pressure suppression systems include a fire suppression agent cylinder. The cylinder contains a fire suppressant and highly pressurized gas (e.g., nitrogen), which forces the agent out when a discharge valve is open. The cylinder is generally shipped pressurized and must adhere to transport strength and thickness requirements for pressurized cylinders. Other fire suppression systems may use cartridge operated non-stored pressure. In this configuration, an empty cylinder is generally shipped to location. During installation, the cylinder is filled with a fire suppressant and connected to a gas cartridge (e.g., containing nitrogen or other pressurized gas). During operation, the pressurized gas is driven to the cylinder from the cartridge, forcing the agent out. Generally, this configuration requires mounting the cartridge to an adjacent (or remote) solid fixture (e.g., a wall or bracket) wall, and connecting the cartridge to the agent cylinder via an added distribution network.

The present disclosure, in accordance with some embodiments, describes an in-situ pressurized agent cylinder. In some embodiments, the agent cylinder is pressurized during installation using a gas cartridge. In some embodiments, the gas cartridge may be configured to directly interface with the agent cylinder. In some embodiments, the gas cartridge may be disconnected once the agent cylinder is pressurized. Accordingly, the present methods and systems may take advantage of the benefits of an unpressurized system for shipping purposes and a pressurized system for integrity monitoring once installed. It may also reduce integrity issues related to field installed distribution network between the cartridge and the agent cylinder in existing systems. Additionally, the present methods may reduce the prospect of service errors when re-pressurizing agent cylinders and may provide cost efficiencies related to shipping of non-pressurized agent cylinders.

Figure 1:
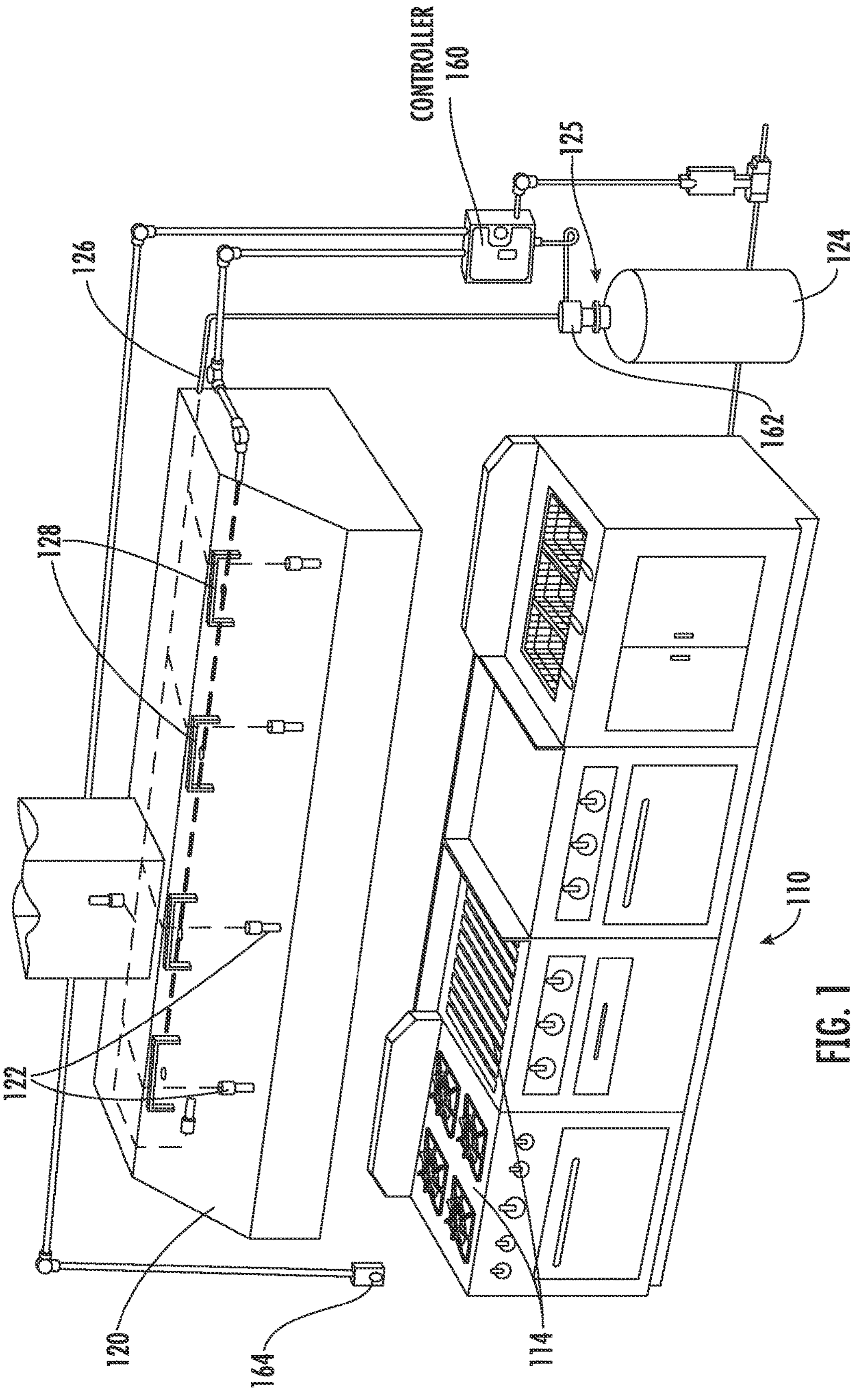
FIG. 1 is a schematic illustration of an exemplary fire suppression system, in accordance with one or more embodiments.

With reference now to FIG. 1, an example of a system 100 for delivering a fire suppression agent to one or more cooking appliances 110 is illustrated. The fire suppression system 100 may be located separate or remotely from the cooking appliance 110, such as within a vent hood 120, or alternatively, may be integrated or housed at least partially within a portion of the cooking appliance 110. It should be understood that the configuration of the fire suppression system 100 may vary based on the overall structural design of the cooking appliance 110. The fire suppression system 100 may include one or more spray nozzles 122 associated with the cooking appliance 110 and a source of fire suppression agent 124 in the form of a self-contained pressure vessel. In embodiments including a plurality of cooking appliances 110, one or more spray nozzles 122 may be dedicated to each cooking appliance 110, or alternatively, one or more evenly spaced spray nozzles 122 may be used for all of the cooking appliances 110. In some embodiments, source of fire suppression agent 124 may be arranged in fluid communication with the nozzles 122 via an agent delivery path defined by a delivery piping system 126. In the event of a fire, the fire suppression agent is allowed to flow through the delivery piping system 126 to the one or more spray nozzles 122 for release directly onto an adjacent cooking hazard area 114 of the one or more cooking appliances 110.

In some embodiments, in operation, the fire suppression system 100 may be actuated in response to a fire sensing device (illustrated schematically at 128), such as a smoke detector or a heat sensor, for example. In response to detecting heat or smoke exceeding an allowable limit, a controller 160 may be configured to direct a signal to an actuator 162 to open a valve 125 to allow the fire suppression agent to flow from the source 124 to the nozzles 122. Alternatively, or in addition, the fire suppression system includes a manual activation system 164, also referred to herein as a pull station, configured to actuate the controller 160 to activate the valve 125 to initiate operation of the fire suppression system 100.

In some embodiments, source of fire suppression agent 124 may be arranged in fluid communication with the nozzles 122 via an agent delivery path defined by a delivery piping system 126. In the event of a fire, the fire suppression agent may be configured to flow through the delivery piping system 126 to the one or more spray nozzles 122 for release directly onto an adjacent cooking hazard area 114 of the one or more cooking appliances 110. In operation, in some embodiments, in response to heat or smoke exceeding an allowable limit, a controller 160 may be configured to direct a signal to an actuator 162 to open a control device 125 to allow the fire suppression agent to flow from the source 124 to the nozzles 122.

Those skilled in the art will readily appreciate that the fire suppression agent can be selected from materials such as water, dry chemical agent, wet chemical agent, or the like. Further, the source of fire suppression agent 124 may additionally contain a gas propellant for facilitating the movement of the fire suppression agent through the delivery piping system 126. However, embodiments where the propellant is stored separately from the fire suppression agent are also contemplated herein and are consistent with disclosed embodiments.

Figure 2:
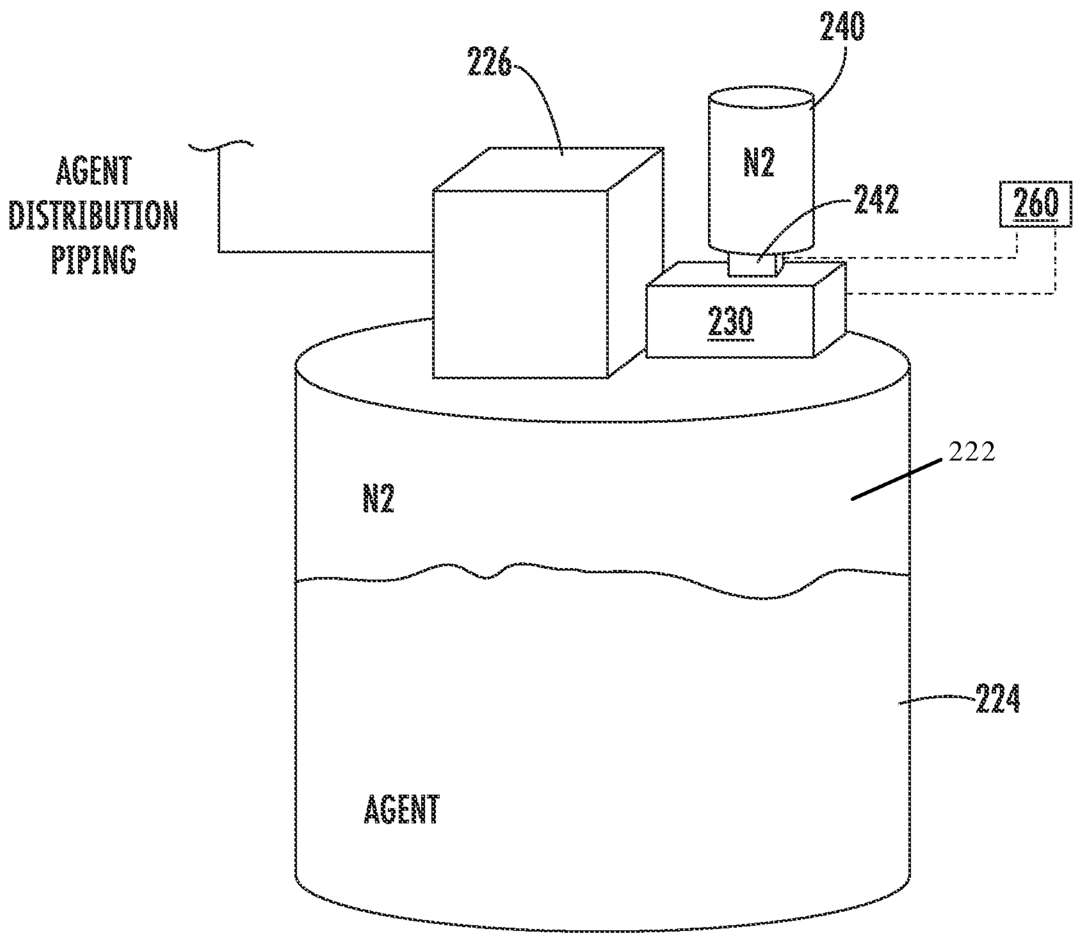
FIG. 2 is a schematic illustration of an exemplary in-situ pressurized agent storage cylinder, in accordance with one or more embodiments.

In some embodiments, source of fire suppression agent 124 may be a cylinder. In some embodiments, cylinder 124 may be configured to be pressurized using a gas cartridge. FIG. 2 is a schematic illustration of an agent storage cylinder 224, in accordance with one or more embodiments. In some embodiments, cylinder 224 may contain a fire suppression agent (e.g., a liquid agent). Cylinder 224 may be filled with the agent while leaving an ullage 222 for pressurization with a highly pressurized gas.

In some embodiments, cylinder 224 may include a charging valve 230 configured to connect with a pressurizing gas cartridge 240 for pressurizing cylinder 224. Charging valve 230 may be operatively connected to cylinder 224. In some embodiments, charging valve 230 may be a check valve. In some embodiments, charging valve 230 may be included in a control device for controlling flow of the fire suppressant during discharge (e.g., control device 125 described above). In some embodiments, charging valve 230 may be independent of the control device. In some embodiments, charging valve 230 may be configured to connect to a member on a top portion of cylinder 224 (for example, on dome 226 of cylinder 224). That said, charging valve 230 may operatively connect with cylinder 224 at any other location on cylinder 224. For example, in some embodiments, charging valve 230 may be configured to connect to control device 125. In other embodiments, charging valve 230 may be included in cylinder 224 (e.g., an integral part of cylinder 224). In some embodiments, the charging valve 230 may be configured to depressurize cylinder 224. For example, charging valve 230 may be used to relief pressure of cylinder 224 to allow examination, servicing, and/or other reasons that may require depressurizing.

In some embodiments, gas cartridge 240 may be configured to hold a gas under high pressure. In some embodiments, gas cartridge 240 may be configured to release gas into an ullage space 222 of cylinder 224 to pressurize the cylinder. In some embodiments, gas cartridge 240 may contain nitrogen and/or other inert gases stored under high pressure and may be used to pressurize cylinder 224. In some embodiments, gas cartridge 240 may be configured to operatively connect to cylinder 224. In some embodiments, gas cartridge 240 may connect to cylinder 224 via charging valve 230. In some embodiments, gas cartridge 240 may include a gas discharge valve 242 configured to operatively couple with charging valve 230 and/or cylinder 224. In some embodiments, responsive to the pressure in cylinder 224 reaching a threshold pressure amount (e.g., between about 170 and about 200 psi), gas cartridge 240 may be disconnected from cylinder 224 (e.g., unthread from check valve 230). In some embodiments, responsive to the pressure in cartridge 240 reaching a threshold discharge pressure amount, gas cartridge 240 may be disconnected from cylinder 224 (e.g., unthread from check valve 230). In some embodiments, gas cartridge 240 may remain connected to cylinder 224 after being pressurized to help prevent leakage.

In some embodiments, cylinder 224 and/or cartridge 240 may include one or more sensors configured for measuring one or more gas parameters before, during, and/or after the pressurizing operation. For example, the one or more sensors may be configured for measuring pressure, temperature, flow, and/or other gas parameters. For example, one or more pressure sensors may be located inside, outside, at, or near the cylinder, the cartridge, and/or the valves. In some embodiments, the pressure sensors may include one or more of a pressure gauge, a check valve, one or more 0 rings, and/or other pressure sensors. In some embodiments, charging valve 230 and/or cartridge discharge valve 242 may include a check valve and may be used for measuring pressure. In some embodiments, the one or more sensors may include connection sensors (e.g., for detecting coupling between components of cylinder 224 and cartridge 240). For example, the one or more sensors may include one or more electrical, optical, and/or mechanical connection sensors.

Figure 3:
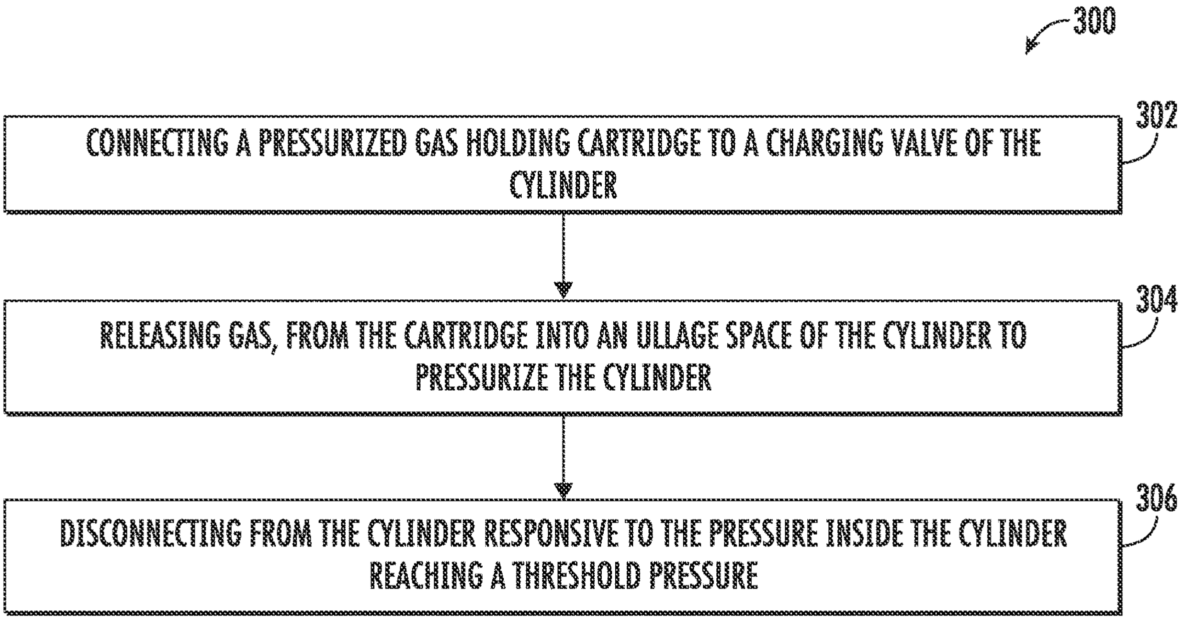
FIG. 3 shows a flow diagram of an exemplary method for in-situ pressurization of an agent storage cylinder, in accordance with one or more embodiments.

FIG. 3 is a flow diagram illustrating an example of a method 300 for in-situ pressurization of an agent storage cylinder, in accordance with one or more embodiments of the present disclosure. The operations of method 300 presented below are intended to be illustrative. In some implementations, method 300 may be accomplished with one or more additional operations not described and/or without one or more of the operations discussed. Additionally, the order in which the operations of method 300 are illustrated in FIG. 3 and described below is not intended to be limiting.

At an operation 302 of method 300, a pressurized gas holding cartridge is operatively connected to the cylinder. In some embodiments, operation 302 may be performed by a charging valve the same as or similar to charging valve 230 (shown in FIG. 2 and described herein).

At an operation 304 of method 300, gas is released into an ullage space 222 of the cylinder to pressurize the cylinder. In some embodiments, operation 304 may be performed by cartridge 240 (shown in FIG. 2 and described herein).

At an operation 306 of method 300, the cartridge is disconnected from the cylinder responsive to the pressure inside the cylinder reaching a threshold pressure.

Returning to FIG. 2, in some embodiments, cylinder 224 may include a pressurization controller 260 configured for controlling one or more pressurization operations. For example, pressurization controller 260 may be configured to determine one or more gas parameters based on output signals from the one or more sensors. In some embodiments, pressurization controller 260 may be configured to determine a status of pressurization of cylinder 224 based on the one or more gas parameters. In some embodiments, pressurization controller 260 may be configured to determine an amount of time and/or amount of gas until pressurization is complete. In some embodiments, pressurization controller 260 may be configured to generate one or more recommendations based on the measured gas parameters. For example, in some embodiments, responsive to the pressure inside cylinder 224 reaching a threshold value, the controller may be configured to recommend disconnection of gas cartridge 240. In some embodiments, pressurization controller 260 may be configured to control operations of charging valve 230 based on the determined pressure inside cylinder 224. For example, in some embodiments, pressurization controller 260 may be configured to control charging valve 230 to increase, decrease, and/or stop flow of pressurization of cylinder 224. Similarly, in some embodiments, pressurization controller 260 may be configured to control operations of the gas discharge valve 242 of cartridge 240 based on the determined pressure inside cylinder 224 and/or pressure inside cartridge 240. For example, in some embodiments, pressurization controller 260 may be configured to control charging valve to increase, decrease, and/or stop flow of pressurization from cartridge 240.

In some embodiments, pressurization controller 260 may be configured to determine a status of a coupling between one or more of cylinder 240, valve 230, cartridge 240, valve 242, and/or other components based on the gas parameters, and/or the connection information. For example, pressurization controller 260 may determine one or more of integrity of a coupling, presence of a leak, status of a seal, and/or other coupling status based on the gas parameters, and/or the connection information. In some embodiments, pressurization controller 260 may be configured to determine presence of leak, amount of leak, rate of leak, and/or other leak information. In some embodiments, pressurization controller 260 may be configured to adjust the pressure information for temperature (e.g., using a temperature sensor) before determining presence of a leak.

For example, in operation, in some embodiments, pressurization controller 260 may be configured to determine presence of a leak in response to a pressure (and/or flow and/or temperature) at a coupling port of cylinder 224 reaching a leak threshold value. In some embodiments, the coupling port may refer to a coupling point between cylinder 224, and valve 230, valve 242, and/or cartridge 240. In some embodiments, pressurization controller 260 may be configured to determine presence of a leak based on a pressure value adjusted for temperature at the port reaching a leak threshold. This may also indicate an absence (or loss) of seal, and/or absence (or loss) of coupling integrity between cylinder 224 and valve 230, valve 242, and/or cartridge 240.

In some embodiments, pressurization controller 260 may be configured to generate one or more recommendations (and/or alarms) based on the determined the status of a coupling. For example, in some embodiments, pressurization controller 260 may be configured to recommend checking the connections, disconnection (e.g., of gas cartridge 240), and/or other recommendations based on a determination of presence of a leak, absence (or loss) of seal or coupling integrity. In some embodiments, controller 160 may be configured to control operations of charging valve 230 and/or discharge valve 242 based on the determined status of a coupling. For example, in some embodiments, pressurization controller 260 may be configured to control charging valve 230 and/or discharge 242 to decrease, and/or stop pressurization of cylinder 224 in response to presence of a leak, loss of seal or/or loss of coupling integrity.

In some embodiments, controller 260 may be configured to display the gas parameters, connection status, status of pressurization, time, the amount of gas needed for pressurization, leak information, and/or other information. In some embodiments, pressurization controller 260 may be configured to send this information to a computer device, a user device, and/or a control board for display and/or for further control operations.

In some embodiments, pressurization controller 260 may be operationally connected with one or more or of cylinder 224, cartridge 240, charging valve 230, and/or gas discharge valve 242. Pressurization controller 260 may be configured to provide processing capabilities to the one or more sensors. In some embodiments, one or more components of pressurization controller 260 may be included in the one or more sensors. In some embodiments, one or more components of pressurization controller 260 may be located outside of cylinder 224 (e.g., remote). In some embodiments, pressurization controller 260 may include one or more processors configured to execute instructions stored on a memory to perform one or more operations described herein. Other components known to one of ordinary skill in the art may be included to gather, process, transmit, receive, acquire, and provide information used in conjunction with the disclosed embodiments.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word “may” is used in a permissive sense (i.e., meaning having the potential to), rather than the mandatory sense (i.e., meaning must). The words “include”, “including”, and “includes” and the like mean including, but not limited to. As used throughout this application, the singular forms “a,” “an,” and “the” include plural referents unless the content explicitly indicates otherwise. Thus, for example, reference to “an element” or “a element” includes a combination of two or more elements, notwithstanding use of other terms and phrases for one or more elements, such as “one or more.” The term “or” is, unless indicated otherwise, non-exclusive, i.e., encompassing both “and” and “or.” Terms describing conditional relationships, e.g., “in response to X, Y,” “upon X, Y,”, “if X, Y,” “when X, Y,” and the like, encompass causal relationships in which the antecedent is a necessary causal condition, the antecedent is a sufficient causal condition, or the antecedent is a contributory causal condition of the consequent, e.g., “state X occurs upon condition Y obtaining” is generic to “X occurs solely upon Y” and “X occurs upon Y and Z.” Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is “based on” another condition or value encompass both instances in which the condition or value is the sole factor and instances in which the condition or value is one factor among a plurality of factors. Unless otherwise indicated, statements that “each” instance of some collection have some property should not be read to exclude cases where some otherwise identical or similar members of a larger collection do not have the property, i.e., each does not necessarily mean each and every.

What is claimed is:

1. A fire suppression system comprising:

an agent storage cylinder configured for storing a fire suppression agent;

a charging valve operatively connected to a top portion of the agent storage cylinder;

a pressure sensor configured for measuring a pressure inside the cylinder;

a cartridge for holding a pressurized gas, wherein the cartridge is configured to be mechanically connected and disconnected to the charging valve:

wherein when the cartridge is operatively connected to the charging valve, the cartridge releases gas directly into an ullage space of the cylinder to pressurize the cylinder; and a controller configured to receive the measured pressure from the pressure sensor and actuate the charging valve, wherein the controller opens the charging valve when the pressure within the cylinder is below the threshold pressure, and the controller is further configured to generate a recommendation to disconnect the cartridge when the cylinder reaches the threshold pressure.

2. The fire suppression system of claim 1, wherein the charging valve is integral with the cylinder.

3. The fire suppression system of claim 1, wherein the cartridge comprises a gas discharge valve, the gas discharge valve configured to interface with the charging valve.

4. The fire suppression system of claim 1, further comprising:

a temperature sensor configured for measuring temperature inside the cylinder, and wherein the cartridge is configured to be disconnected based on the pressure and temperature inside the cylinder.

5. A method for in-situ pressurization of an agent storage cylinder, the method comprising:

operatively connecting a pressurized gas holding cartridge to a charging valve of the cylinder;

releasing gas, from the cartridge directly into an ullage space of the cylinder to pressurize the cylinder;

monitoring a pressure within the cylinder;

generating a recommendation when the pressure inside the cylinder reaches a threshold pressure; and disconnecting from the charging valve responsive to the pressure inside the cylinder reaching the threshold pressure.

6. The method of claim 5, further comprising:

operatively connecting a gas discharge valve to the cartridge, and wherein connecting the cartridge to the charging valve comprises operatively connecting the discharge valve and the charging valve.

7. The method of claim 5, further comprising:

controlling the charging valve based on the pressure inside the cylinder.

8. The method of claim 7, wherein controlling the charging valve comprises reducing and/or stopping a flow of pressurization of the cylinder.

9. The fire suppression system of claim 5, further comprising:

measuring, with a pressure sensor, pressure inside the cylinder.

10. The fire suppression system of claim 5, further comprising:

measuring, with a temperature sensor, temperature inside the cylinder, and disconnecting the cartridge is based on the pressure and temperature inside the cylinder.

11. An agent storage cylinder for storing a fire suppression agent, agent storage cylinder comprising:

a charging valve operatively connected to a top portion of the agent storage cylinder;

a cartridge for holding a pressurized gas, the cartridge configured to be releasably connected to the charging valve;

a pressure sensor configured for measuring pressure inside the cylinder; wherein the cylinder is configured to be pressurized in-situ using the pressurized gas within the cartridge so as to receive the pressurized gas directly into an ullage space of the agent storage cylinder; and a controller configured to receive the measured pressure from the pressure sensor and actuate the charging valve, wherein the controller opens the charging valve when the pressure within the cylinder is below the threshold pressure and generates a recommendation to disconnect the cartridge when the cylinder reaches the threshold pressure.

12. The agent storage cylinder of claim 11, wherein the charging valve is integral with the cylinder.

13. The agent storage cylinder of claim 11, further comprising:

a temperature sensor configured for measuring temperature inside the cylinder, and wherein the cylinder may be disconnected from the cartridge based on the measured temperature inside the cylinder.

* * * * *